(12) United States Patent
Russell et al.

(10) Patent No.: US 9,407,094 B2
(45) Date of Patent: Aug. 2, 2016

(54) SYSTEMS AND METHODS FOR ADAPTIVE LOAD CONTROL

(71) Applicant: Control4 Corporation, Salt Lake City, UT (US)

(72) Inventors: James K. Russell, Salt Lake City, UT (US); Luis F. Gomez, Salt Lake City, UT (US); Michael Stephenson, Salt Lake City, UT (US); William Richard Schonle, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 610 days.

(21) Appl. No.: 13/871,700

(22) Filed: Apr. 26, 2013

(65) Prior Publication Data
US 2014/0319932 A1    Oct. 30, 2014

(51) Int. Cl.
*H02J 3/01*    (2006.01)
*H02J 3/00*    (2006.01)

(52) U.S. Cl.
CPC ............. *H02J 3/01* (2013.01); *H02J 2003/002* (2013.01); *Y02E 40/40* (2013.01); *Y10T 307/826* (2015.04)

(58) Field of Classification Search
CPC .. H02J 3/01; H02J 2003/002; Y10T 307/826; Y02B 70/3225; Y04S 20/222
USPC ........... 307/125, 112, 116, 126; 323/318, 319
See application file for complete search history.

(56) References Cited

U.S. PATENT DOCUMENTS

| | | | | |
|---|---|---|---|---|
| 5,644,463 | A * | 7/1997 | El-Sharkawi | H01H 9/56 361/2 |
| 7,336,463 | B2 | 2/2008 | Russell et al. | |
| 2007/0057641 | A1* | 3/2007 | Russell | H05B 39/048 315/209 R |
| 2010/0085894 | A1* | 4/2010 | Johnson | H02G 3/00 370/254 |
| 2010/0280774 | A1* | 11/2010 | Ewing | H04Q 9/00 702/60 |
| 2012/0286826 | A1 | 11/2012 | King et al. | |
| 2013/0044395 | A1 | 2/2013 | Rodgers et al. | |
| 2013/0057247 | A1 | 3/2013 | Russell et al. | |
| 2013/0187631 | A1* | 7/2013 | Russell | G01R 19/175 324/76.77 |
| 2013/0241527 | A1* | 9/2013 | Russell | H02J 3/00 323/319 |

OTHER PUBLICATIONS

International Search Report issued for International Patent Application No. PCT/US2014/035026 on Mar. 27, 2015.

* cited by examiner

*Primary Examiner* — Kenneth B Wells
*Assistant Examiner* — James P Evans
(74) *Attorney, Agent, or Firm* — Austin Rapp & Hardman

(57) ABSTRACT

A method for adaptive load control by an electronic device is described. The method includes determining a wiring mode. The method also includes determining a frequency of a power source. The method further includes capturing a voltage waveform. The method additionally includes capturing a current waveform. The method also includes determining a load type of a load based on the voltage waveform and the current waveform. The method further includes determining a power factor based on the voltage waveform, the current waveform and the wiring mode. The method additionally includes operating the load based on the load type, the power factor and the frequency.

20 Claims, 10 Drawing Sheets

SYSTEMS AND METHODS FOR ADAPTIVE LOAD CONTROL

TECHNICAL FIELD

The present disclosure relates generally to electronic devices. More specifically, the present disclosure relates to systems and methods for adaptive load control.

BACKGROUND

In recent years, the price of electrical devices has decreased dramatically. In addition, the size of electrical devices has continued to decrease. Further, electrical devices continue to increase in capability and convenience.

Decreasing prices and increasing capabilities of electrical devices have permitted modern devices to be conveniently used in homes and businesses. Many homes and businesses include multiple electrical devices to assist in everyday tasks. While these electrical devices may provide convenience and entertainment, many also require control. Moreover, these electronic devices consume electrical power and may consume other resources. The ever-increasing cost of resources, such as electricity, may be a concern.

With more and more electrical devices being used in homes and businesses, identifying and controlling the electrical devices is important. Furthermore, electrical devices and loads may be incompatible with each other or may lack control flexibility. This may require additional time to set up the electrical devices and may reduce the efficiency of the electrical devices. As illustrated by this discussion, adaptive load control may be beneficial.

DETAILED DESCRIPTION

Figure 1:
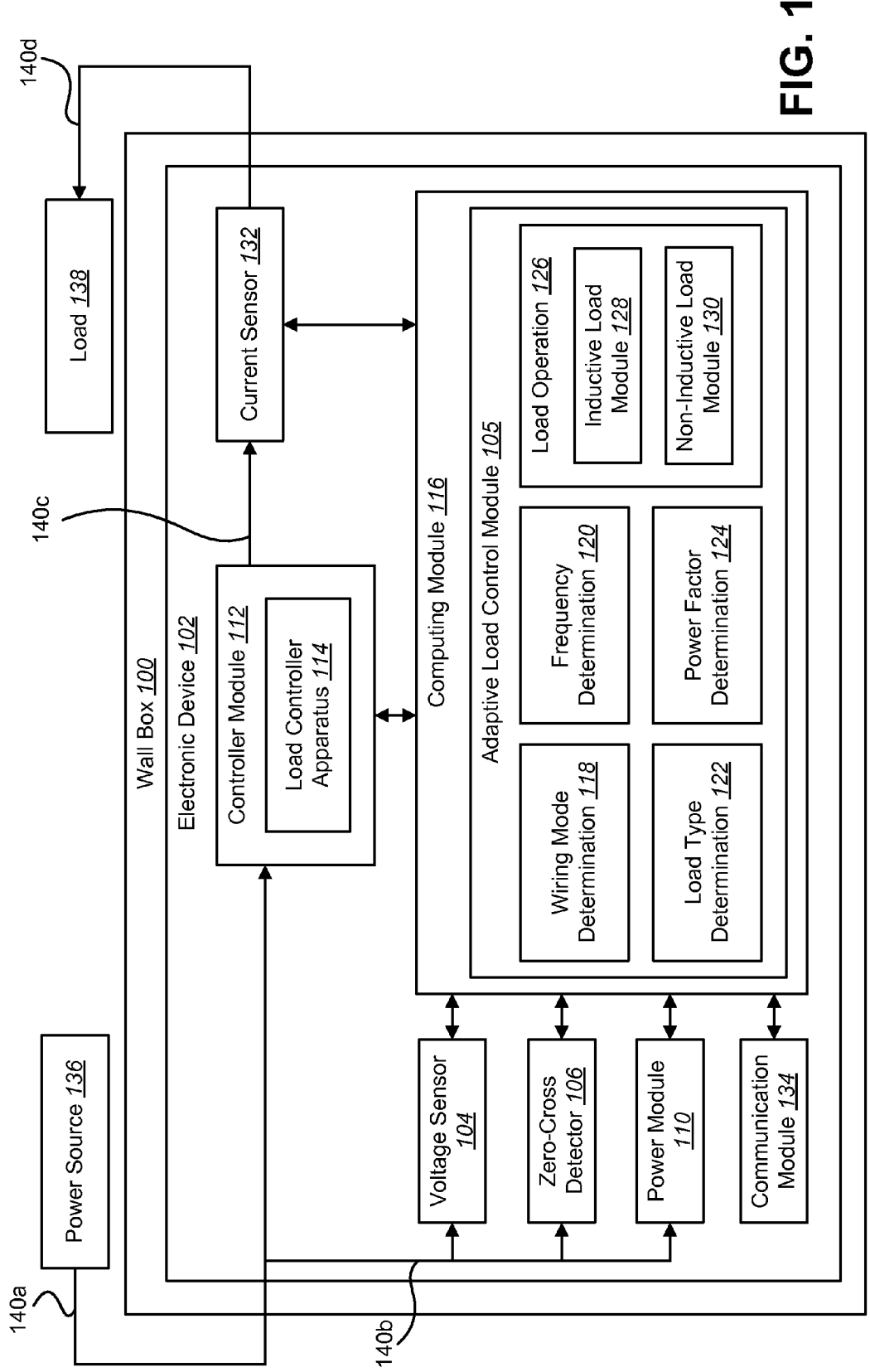
FIG. 1 is a block diagram illustrating one configuration of an electronic device for performing adaptive load control.

A method for adaptive load control by an electronic device is described. The method includes determining a wiring mode. The method also includes determining a frequency of a power source. The method further includes capturing a voltage waveform. The method additionally includes capturing a current waveform. The method also includes determining a load type of a load based on the voltage waveform and the current waveform. The method further includes determining a power factor based on the voltage waveform, the current waveform and the wiring mode. The method additionally includes operating the load based on the load type, the power factor and the frequency.

If the load type is inductive, then operating the load may include determining an estimated current zero-cross. Operating the load may also include switching off the load based on the estimated current zero-cross.

Determining the estimated current zero-cross may be based on a mathematical equation. Determining the estimated current zero-cross may be based on a lookup table. Determining the estimated current zero-cross may be based on a lookup table and a mathematical equation. The estimated current zero-cross may include a delay from a voltage zero-cross.

If the load type is resistive or capacitive, then operating the load may include switching off the load based on the voltage waveform. The wiring mode may be one of a switch-leg mode and a non-switch-leg mode. The electronic device may have dimensions for fitting within a wall box. The method may be performed in response to a new load or an out of range condition.

An electronic device for adaptive load control is also described. The electronic device includes a voltage sensor that captures a voltage waveform. The electronic device also includes a current sensor that captures a current waveform. The electronic device further includes a computing module coupled to the voltage sensor and the current sensor. The computing module determines a wiring mode. The computing module also determines a frequency of a power source. The computing module further determines a load type of a load based on the voltage waveform and the current waveform. The computing module also determines a power factor based on the voltage waveform, the current waveform and the wiring mode. The computing module further operates the load based on the load type, the power factor and the frequency.

The systems and methods disclosed herein include an electronic device for adaptive load control. For example, the electronic device (e.g., switch, dimmer, etc.) may be included within a wall box. The electronic device may be capable of determining a load type and controlling electrical power delivered to the load based on the load type. The load type may be used to determine whether to drive the load in a forward (e.g., leading edge) or reverse (e.g., trailing edge) phase. Furthermore, the load type may be used to determine whether to drive the load based on a voltage waveform or a current waveform.

Different lighting load types, available in today's evolving market, require different dimmer types to ensure compatibility. Most commonly referred to as forward phase or reverse phase dimmers, these two types of dimmers are generally required to properly control capacitive, resistive and inductive load types. Therefore, an installer and/or a user currently must know what type of dimmer is being used and must have an understanding of the load type to be controlled in order to ensure that the dimmer is compatible with the load type. If the installer or user is mistaken in the dimmer or load type, or if a dimmer is configured with a load that subsequently changes due to the introduction of a different load type (e.g., the user or homeowner changes the bulb or fixture), this may result in the need for different dimmer technology.

Additionally, inductive loads present a particular challenge with respect to dimmer operation. For example, inductive loads can potentially reflect electromotive force (EMF) due to their inherent electromagnetic properties. Furthermore, if the waveforms for dimming inductive loads are not monitored and controlled, then the result may be catastrophic to the load control device or the load itself.

An electronic device operating according to the systems and methods described herein may detect the type of load to which the electronic device is connected. The electronic device may also adapt specific parameters within the electronic device to match the characteristics for a given load to which it is connected. Therefore, the systems and methods described herein may minimize the reflected EMF that can result from switching off an inductive load while the load is still charged with current. Furthermore, the systems and methods described herein provide for a single electronic device that may automatically adapt to a load. This may relieve an installer and/or end-user from having to be educated and aware of the compatibility of different load types and load controlling devices.

Various configurations are now described with reference to the figures, where like reference numbers may indicate functionally similar elements. The systems and methods as generally described and illustrated in the figures herein could be arranged and designed in a wide variety of different configurations. Thus, the following more detailed description of several configurations, as represented in the figures, is not intended to limit scope, as claimed, but is merely representative of the systems and methods. As used herein, the term "plurality" may indicate two or more. For example, a plurality of components refers to two or more components.

FIG. 1 is a block diagram illustrating one configuration of an electronic device 102 for performing adaptive load control. The electronic device 102 may have dimensions for fitting within a wall box 100. The electronic device 102 may include a voltage sensor 104, a current sensor 132, a computing module 116 and a controller module 112. The computing module 116 may be coupled to the voltage sensor 104 and to the current sensor 132. The computing module 116 may be coupled to the controller module 112. The electronic device 102 may also include a zero-cross detector 106 coupled to the computing module 116. In addition, the electronic device 102 may include a power module 110 and a communication module 134. The electronic device 102 may be coupled to a power source 136 and to a load 138.

Examples of electronic devices 102 include electronic circuits, integrated circuits, circuits with discrete components (e.g., resistors, capacitors, transistors, etc.), devices with processors, computers, memory cells, latches, logic gates, etc. In one example, the electronic device 102 has a switch that includes discrete components and a microprocessor that may be used to control an electric load 138 and/or manage resource consumption of an electric load 138. In another example, the electronic device 102 is a dimmer circuit including discrete components and a microprocessor that may be used to control an electric load 138 and/or manage resource consumption of an electric load 138. As used herein, a "module" may be implemented in hardware, software, firmware or any combination thereof.

In one configuration, the electronic device 102 may operate as a switch. In this configuration, the electronic device 102 may have two discrete states that may be used to control a load 138. The electronic device 102 may be in an "off" state or in an "on" state. Therefore, the electronic device 102 may turn on or off electrical power to the load 138. In one implementation, the electronic device 102 may use a relay (e.g., mechanical, solid state, etc.) to turn on or off electrical power to the load 138. A simple example of a switch is a light switch that turns on or off electrical power to a light. The light switch may turn on the light by turning on electrical power to the light or turn off the light by turning off electrical power to the light.

In another configuration, the electronic device 102 may operate as a dimmer. In this configuration, the electronic device 102 may have variable states that may be used to control a load 138. The electronic device 102 may variably adjust the amount of electrical power that is driven to the load 138 (e.g., by adjusting the root mean square (RMS) voltage, adjusting pulse-width modulation, adjusting duty cycle, etc.). For example, the electronic device 102 may provide 0% electrical power, 100% electrical power or some percentage in between. In one configuration, the electronic device 102 may use a semiconductor (e.g., metal-oxide-semiconductor field-effect transistor (MOSFET), triode for alternating current (TRIAC), transistors, etc.) to control the load 138. A simple example of an electronic device 102 operating according to the systems and methods disclosed herein is a light dimmer that may turn on or off and variably control the brightness of a light. For example, the light dimmer may increase the brightness of the light by increasing the amount of electrical power driven to the light. Similarly, the light dimmer may decrease the brightness of the light by decreasing the amount of electrical power driven to the light. In some configurations, the electronic device 102 may include switching and dimming capabilities.

The electronic device 102 (e.g., switch, dimmer, etc.) may control (e.g., drive) a load 138. Examples of loads 138 include lights, motors, appliances, etc. Examples of types of lights include incandescent, arc, gas discharge, laser, fluorescent, light emitting diode (LED), sulfur, etc. Examples of types of motors include ceiling fan, exhaust fan, pump, etc. Examples of appliances include stoves, refrigerators, heaters, air-conditioners, etc. The load type may determine whether the electronic device 102 functions as a switch and/or dimmer, depending on the capabilities of the load 138. A load 138 may be characterized as one of three different types of impedances (e.g., load types). Practically speaking, a load 138 includes all three types of impedances. However, in each case, one type of impedance may dominate. The different types of impedances are inductive impedance, capacitive impedance and resistive impedance.

Inductive load types typically have a magnetic inductor of some sort. One of the most common examples of an inductive load type is a magnetic transformer for low voltage lighting. Inductive load types have a waveform characteristic in which the phase of the current lags (e.g., comes after) the voltage waveform.

Capacitive load types typically have a detectable amount of capacitance. Common examples of a capacitive load type are dimmable fluorescent lights and electronic low voltage lighting. Capacitive load types have a waveform characteristic in which the phase of the current leads (e.g., comes before) the voltage waveform.

Resistive load types typically exhibit the current and voltage in phase with each other. Therefore, there may be no discernible lead or lag between current and voltage in resistive load types. Common examples of a resistive load type are incandescent lights.

The current and voltage waveforms may differ significantly depending on the wiring mode of the electronic device 102 and the load 138. As used herein, the wiring mode may refer to a switch-leg mode or a non-switch-leg mode. In a switch-leg mode (also referred to as series mode), the electronic device 102 may be wired into a circuit without a neutral (as illustrated in FIG. 4). Therefore, the terms "switch-leg" and "switch-leg mode" may refer to a wiring mode (e.g., configuration) where the electronic device 102 is wired in series with the load 138 (without a neutral line available, for example). For instance, a hot lead from an electrical panel may be coupled to one lead of the electronic device 102 and the neutral lead and load lead of the electronic device 102 may be coupled to the load 138. In this case, the electronic device 102 may be powered using the return to the load 138. A switch-leg mode may also be referred to as a series mode. Additionally, "non-switch-leg" and "non-switch-leg mode" may refer to configurations where the electronic device 102 is wired in parallel with the load 138 (with a neutral line, for example). The non-switch-leg mode is further illustrated in FIG. 3.

It may be common to have wiring situations where a neutral wire is not available at the location where the electronic device 102 will be installed (e.g., the wall box 100). In these situations, the electronic device 102 may not be powered in parallel with the hot and neutral alternating current (AC) wires. Instead, the electronic device 102 may be wired in series with the hot and load wires. These may be the situations in which the electronic device 102 is wired in switch-leg mode.

If the electronic device 102 is wired in switch-leg mode, the electronic device 102 may perform as a dimmer (not a switch). It is not possible to operate (e.g., drive) the load 138 connected to the electronic device 102 to a full 100 percent level (e.g., output) in switch-leg mode. Therefore, the electronic device 102 may operate the load 138 at a maximum allowable level for switch-leg mode. In one configuration, the maximum allowable level for switch-leg mode is approximately 55 percent. The voltage waveform may look significantly different in switch-leg mode even when the load 138 is turned off. This may be especially true when the electronic device 102 may be connected to an electronic (e.g., capacitive) low voltage load.

The wall box 100 (e.g., electrical box, outlet box, switch box, pattress, etc.) is the container for the body of an electrical device 102 (e.g., light switch, power outlet) so that the face of the electrical device 102 is flush with a wall. In general, the width of a wall box 100 is measured in "gangs" which indicates the number of electrical components (e.g., light switch, power outlet) that it can hold. For example, a single gang wall box 100 can hold a single electrical component (e.g., light switch, power outlet) and a double gang wall box 100 can hold two electrical components (e.g., light switch, power outlet) side by side. The depth of a wall box 100 may be standard depth, shallow depth, or deep depth. For purposes of the systems and methods disclosed herein, a wall box 100 is a single gang standard depth wall box 100 and a wall box device is an electronic device 102 that may be held in a single gang standard depth wall box. In one configuration, a European style wall box 100 having a width of 86 millimeters, a height of 86 millimeters and a depth of 35 millimeters may be used. In another configuration, a United States style, single gang, standard depth wall box 100 may be used.

The voltage sensor 104 may capture a voltage waveform. For example, the voltage sensor 104 may continuously capture the voltage waveform by sampling the voltage waveform for one cycle of alternating current (AC). The voltage sensor module 104 may include discrete components. In some configurations, the voltage sensor module 104 may only include discrete components.

The voltage sensor 104 may capture a continuous time voltage waveform of an AC signal. For example, the voltage sensor 104 may capture a continuous time voltage waveform of the line feed from the power source 136. The continuous time voltage waveform may capture how the voltage varies over each cycle of the AC signal. In some configurations, the electronic device 102 may use an analog-to-digital (A/D) converter for capturing a discrete time (e.g., digital) voltage waveform of an AC signal by sampling the continuous time voltage waveform captured by the voltage sensor 104. For example, the A/D converter may sample at sufficient intervals to capture how the voltage varies over one cycle of the AC signal.

The zero-cross detector 106 may be used to determine the zero crossings of an AC signal. For example, the zero-cross detector 106 may indicate the start and finish of one cycle of AC. The zero-cross detector 106 may be used to align the sampling of the voltage waveform and the current waveform. The samplings of the voltage sensor 104 and the samplings of the current sensor 132 may be aligned with reference to time so that the phase shift between the voltage waveform and the current waveform may be determined.

The zero-cross detector 106 may additionally be used to determine the AC power frequency of a power source 136. For example, the zero-cross detector 106 may detect that the AC power frequency of the power source 136 is 60 Hertz (Hz). In another example, the zero-cross detector 106 may detect that the AC power frequency of the power source 136 is 50 Hertz (as may be used in Europe and parts of the Pacific Rim, for example). The electronic device 102 may automatically adjust for frequency differences based on the AC power frequency of the system. For instance, the duty cycle required to illuminate a light bulb at 50% brightness may be higher in a 50 Hertz system than it may be in a 60 Hertz system.

The current sensor 132 may capture a current waveform. For example, the current sensor 132 may continuously capture the current waveform by sampling the current waveform for one cycle of AC. The current sensor 132 may include discrete components. In some configurations, the current sensor 132 may only include discrete components.

The current sensor 132 may capture a continuous time current waveform of an AC signal. For example, the current sensor 132 may capture a continuous time current waveform of the line feed from the power source 136. The continuous time current waveform may capture how the current varies over each cycle of the AC signal.

The electronic device 102 may additionally include an analog-to-digital (A/D) converter (not shown) for capturing a discrete time (e.g., digital) current waveform of an AC signal by sampling the continuous time current waveform captured by the current sensor 132. For example, the A/D converter may sample at sufficient intervals to capture how the current varies over one cycle of the AC signal. The A/D converter may sample the current waveform to correspond to the sampling of the voltage waveform. Depending on the impedance of the circuit (e.g., the electronic device 102 and the load 138), there may be a phase shift between the voltage waveform and the current waveform. The zero-cross detector 106 provides synchronization to the voltage waveform that then forms the time basis for the current waveform's phase shift to be determined with respect to the voltage waveform.

The computing module 116 may direct the operation of the electronic device 102. For example, a computing module 116 may include a microprocessor for controlling the electronic device 102. The computing module 116 may receive the discrete time voltage waveform, the discrete time current waveform and the output of the zero-cross detector 106. The computing module 116 may perform operations based on the voltage waveform, current waveform and zero-cross detector 106. For example, the computing module 116 may include an adaptive load control module 105 to implement adaptive load control. The adaptive load control module 105 may include a wiring mode determination module 118, a frequency determination module 120, a load type determination module 122, a power factor determination module 124 and a load operation module 126.

The wiring mode determination module 118 may determine the wiring mode of the circuit (e.g., the electronic device 102 and the load 138). For example, the wiring mode determination module 118 may determine whether the electronic device 102 and the load 138 are wired in a non-switch-leg mode (e.g., parallel mode) or in a switch-leg mode (e.g., series mode). As described above, in a non-switch-leg mode, the electronic device 102 may be wired in parallel with the load 138 (with a neutral line, for example). In a switch-leg mode (also referred to as series mode), the electronic device 102 may be wired in series with the load 138 (without a neutral line available, for example).

The frequency determination module 120 may determine the frequency of the power source 136. For example, the frequency determination module 120 may use the zero-cross detector 106 to determine the AC frequency of the power source 136. In one configuration, the electronic device 102 may determine the frequency of the power source 136 within a range of 45 Hz to 65 Hz.

The load type determination module 122 may determine the load type based on the voltage waveform, the current waveform and the wiring mode. In one configuration, the energy measurement functions (e.g., voltage waveform measurement, current waveform measurement, phase shift, etc.) of the electronic device 102 may be supplied by sampling the voltage and current waveforms for one full cycle of an alternating current (AC) signal. In another configuration, the energy measurement functions of the electronic device 102 may be supplied by sampling the voltage and current waveforms for a duty cycle of a load 138. The electronic device 102 may use the zero-cross signal to align the sampling of these two waveforms. Samples may then be taken and calculated and reported periodically.

The load type determination module 122 may determine a phase shift between the voltage waveform and the current waveform. If there is a phase shift with the voltage waveform leading the current waveform, then the load 138 has inductive impedance. If the there is a phase shift with the current waveform leading the voltage waveform, then the load 138 has capacitive impedance. If there is no phase shift or a small phase shift (e.g., less than a threshold phase shift) between the voltage waveform and the current waveform, then the load 138 has resistive impedance. The phase shift may differ depending on the wiring mode (e.g., switch-leg mode or non-switch-leg mode). Therefore, the electronic device 102 may also consider the wiring mode when determining the load type.

The power factor determination module 124 may determine the power factor based on the voltage waveform and the current waveform. From the voltage waveform and current waveform samples, the power factor determination module 124 may determine a voltage measurement in RMS volts, a current measurement in RMS current, a watts measurement and a volt-ampere measurement. From these measurements, the power factor determination module 124 may determine the power factor.

The load operation module 126 may operate the load 138 based on the load type, the power factor and the frequency. The load operation module 126 may include an inductive load module 128 and a non-inductive load module 130. The load operation module 126 may change the way the controller module 112 drives the load 138 based on the impedance of the load 138 and the power at which the load 138 is operating. The electronic device 102 may operate the load 138 differently for inductive and non-inductive load types.

If the load type is inductive, then the inductive load module 128 may operate the load 138 based on the current waveform (instead of the voltage waveform). The inductive load module 128 may operate the load 138 based on the current waveform to reduce or avoid the EMF from an inductive load 138. When the electronic device 102 drives an inductive or highly inductive load 138, the current will naturally lag the voltage. As described above, the zero-cross detector 106 may be based on the voltage. If the electronic device 102 switches off the current to an inductive load 138 based on the voltage waveform (e.g., the voltage zero-cross), then the electronic device 102 may prematurely switch off the inductive load 138. This may increase the instantaneous rate of voltage change over time (dv/dt) of the inductive load 138, which may result in a charge of voltage that is reflected back to the electronic device 102 from the load 138.

Because of the natural properties (e.g., EMF) of an inductor, an inductive load 138 opposes changes in current. The resulting function of a change in current to an inductive load 138 is voltage. Therefore, to reduce the resulting EMF when driving an inductive load 138, the electronic device 102 may switch off the inductive load 138 based on the sinusoidal current waveform to achieve a low dv/dt. In other words, the electronic device 102 may switch off the inductive load 138 when the current reaches 0. However, if the electronic device 102 switches off the inductive load 138 based solely on the voltage (e.g., the voltage zero-cross), current may still be flowing in the inductive circuit when the load 138 is disengaged, which may result in an EMF or voltage spike from the load 138. This EMF may damage the semiconductors (e.g., field-effect transistor (FET)) or other circuitry that may be used (in the load controller apparatus 114, for instance) to switch the load on and off.

To minimize the EMF, the inductive load module 128 may switch off the load 138 based on the current waveform. For example, the inductive load module 128 may determine an estimated current zero-cross. In one configuration, the inductive load module 128 may determine the estimated current zero-cross based on a mathematical equation (e.g., polynomial equation), a lookup table or a combination of a lookup table and mathematical equation. This may be accomplished as described below in connection with FIG. 2. The mathematical equation and/or lookup table may use the power factor and frequency as inputs to determine the estimated current zero-cross. Upon determining the estimated current zero-cross, the inductive load module 128 may switch off the load 138 based on the estimated current zero-cross. For example, the inductive load module 128 may switch off the load at or near the estimated current zero-cross.

If the load type is non-inductive (e.g., the load type is resistive or capacitive), then the non-inductive load module 130 may operate the load 138 based on the voltage waveform. For example, the non-inductive load module 130 may determine when to switch off the load 138 based on the voltage waveform. For instance, the non-inductive load module 130 may switch off the load 138 based on (e.g., relative to) the voltage waveform zero-cross.

An electronic device 102 operating according to the systems and methods described herein may have the ability to operate an attached load 138 using either forward phase or reverse phase pulse width modulation (PWM). For example, some load types, such as inductive (e.g., a magnetic transformer attached to one or more 12 volt (V) halogen lights), require forward phase dimming. Therefore, the electronic device 102 may perform forward phase pulse width modulation for an inductive load type based on the estimated current zero-cross. Other load types, such as capacitive (e.g., an electronic low voltage transformer connected to one or more 12V halogen lights), require reverse phase dimming. Therefore, if the load type is capacitive, the electronic device 102 may use reverse phase pulse width modulation based on the voltage waveform. Yet other load types, such as resistive (e.g., incandescent lights), may be dimmed in either forward or reverse phase. Therefore, if the load type is resistive (e.g., the power factor is 1), the non-inductive load module 130 may use either forward or reverse phase pulse width modulation based on the voltage waveform. Using the wrong mode of control (e.g., forward phase or reverse phase PWM) may seriously damage or destroy the load 138 and/or the electronic device 102 itself. Therefore, it is desirable to determine the load type attached to the electronic device 102 to ensure the proper mode of control is used.

The controller module 112 may control the amount of power delivered to the load 138. In one configuration (e.g., switch), the controller module 112 may turn on (e.g., enable) the power or turn off (e.g., disable) the power to the load 138. In another configuration (e.g., dimmer), the controller module 112 may adjust the amount of power that is delivered to the load 138 (e.g., enable, disable, adjust duty cycle, etc.). The controller module 112 may include a load controller apparatus 114 for switching and/or dimming the power delivered to the load 138. Examples of the load controller apparatus 114 include switches (e.g., mechanical relay, solid state relay, etc.) and dimmers (e.g., MOSFET, TRIAC, transistor, etc.). The controller module 112 may include discrete components. In some configurations, the controller module 112 may only include discrete components.

The power module 110 may convert the AC feed line power to low voltage direct current power for powering components of the electronic device 102. The power module 110 may include discrete components. In some configurations, the power module 110 may only include discrete components.

The communication module 134 may be used to communicate with another electronic device (e.g., wall box device, central controller, server, keypad, etc.). The electronic device 102 may communicate over a wired and/or wireless channel. The electronic device 102 may receive data from another electronic device (e.g., control commands, operating parameters of the load, operating parameters of the electronic device, configuration settings, firmware updates, etc.). The electronic device 102 may transmit data to another electronic device (e.g., energy measurement values, fault conditions, status notifications, real-time operating data, etc.). The other electronic device may also communicate to the electronic device 102 a schedule for operating the load 138 and/or the amount of power that should be delivered to the load 138. The electronic device 102 may operate according to the parameters received from the other electronic device.

In one configuration, the communication module 134 may receive one or more commands to initiate a training mode. Upon initiating the training mode, the electronic device 102 may adapt the load 138 operation. For example, when the training mode is initiated, the electronic device 102 may determine the load type and operate the load 138 as described below in connection with FIG. 2.

The power source 136 may output high voltage (e.g., 240, 120) AC. The high voltage AC may be coupled to electronic device 102 through feed line 140a-c. The load 138 may be coupled to the electronic device 102 through feed line 140d.

The current sensor 132 may be in line with the feed lines 140c and 140d so that load current may be determined.

In some implementations, one or more of the voltage sensor 104, zero-cross detector 106, current sensor 132, computing module 116 and controller module 112 may include discrete components. In some configurations, one or more of the voltage sensor 104, zero-cross detector 106, current sensor 132, computing module 116 and controller module 112 may only include discrete components. The use of discrete components may be beneficial for allowing certain components of the electronic device 102 to be housed within the wall box 100. In some configurations, the electronic device 102 may be completely housed within the wall box 100.

Figure 2:
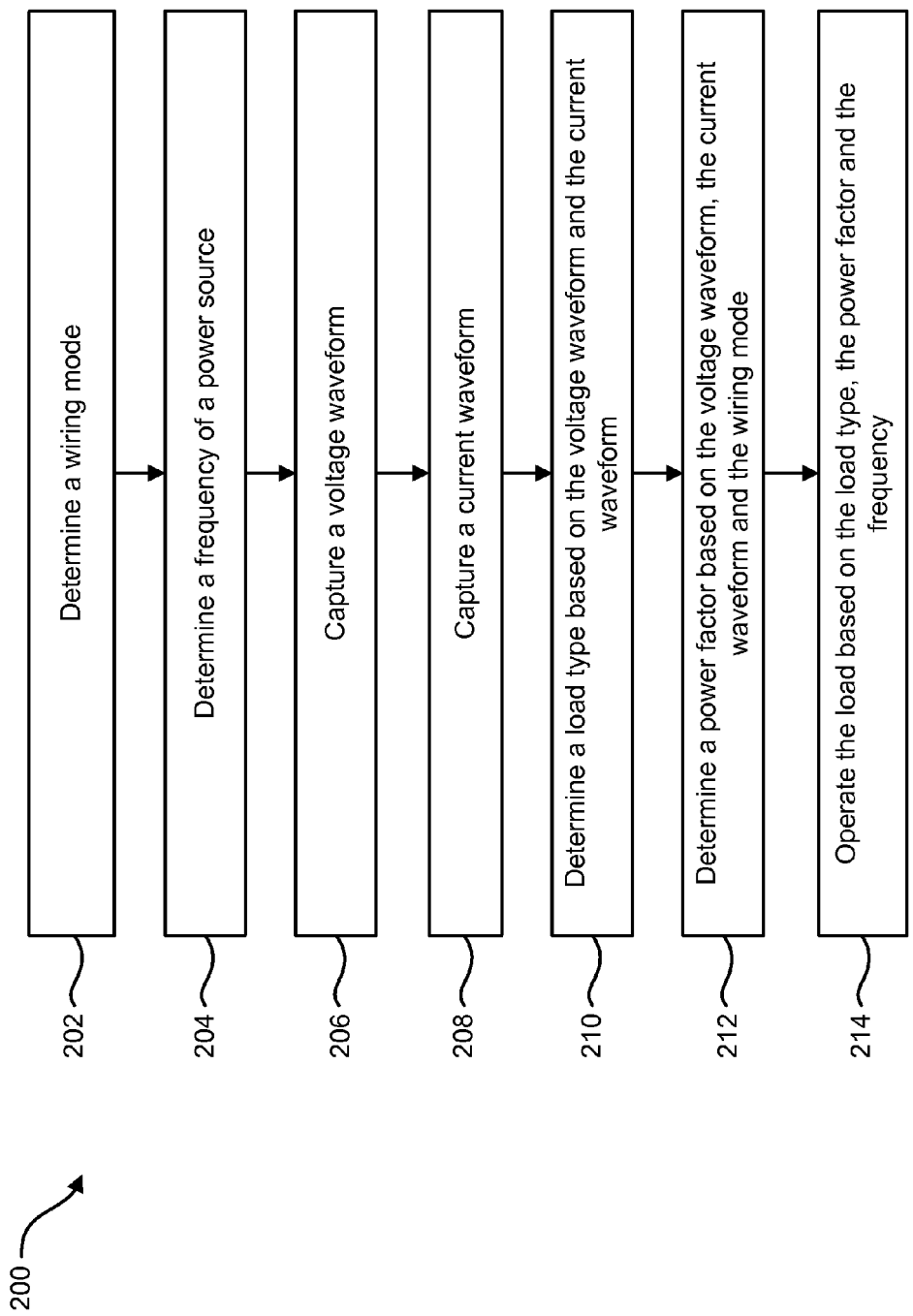
FIG. 2 is a flow diagram illustrating one configuration of a method for adaptive load control by an electronic device.

FIG. 2 is a flow diagram illustrating one configuration of a method 200 for adaptive load control by an electronic device 102. The electronic device 102 may have dimensions for fitting within a wall box 100. In some configurations, the electronic device 102 may include mounting (e.g., brackets, tabs, screw ports, etc.) for integration with the wall box 100. In another configuration, the electronic device 102 may be a wall box dimmer.

The electronic device 102 may determine 202 a wiring mode. For example, the electronic device 102 may determine 202 whether the electronic device 102 and the load 138 are wired in a parallel mode (e.g., non-switch-leg mode) or in a series mode (e.g., switch-leg mode). In a non-switch-leg mode, the electronic device 102 may be wired in parallel with the load 138 (with a neutral line, for example). In a switch-leg mode (also referred to as series mode), the electronic device 102 may be wired in series with the load 138 (without a neutral line available, for example).

In one configuration, the zero-cross detector 106 may output a zero-cross pulse having a width proportional to the length of time that the voltage detected by the zero-cross detector 106 stays within the region around zero volts. The pulses from the zero-cross detector 106 may be supplied to the computing module 116 for analysis. The pulses may be measured either by the width of the pulse, or the portion of the overall duty cycle of the voltage waveform. When it is determined (by the computing module 116) that the duration of or duty cycle of the pulse exceeds a pre-determined time length, then the computing module 116 knows that a serial configuration (e.g., switch-leg mode) exists. When it is determined that the duration or duty cycle of the pulse is less than the pre-determined time length, then the computing module 116 knows that a parallel configuration (e.g., non-switch-leg mode) exists and a maximum amount of power may be supplied to the load 138.

The electronic device 102 may determine 204 the frequency of a power source 136. In one configuration, the electronic device 102 may include a zero-cross detector 106 that may be used to determine the AC frequency of the power source 136. For example, the electronic device 102 may disable any and all interrupts to ensure the most accurate zero-cross measurement. The electronic device 102 may force the load 138 into an "off" state. The electronic device 102 may initialize a timer/counter to operate as a 16-bit or 32-bit free running up counter with a known frequency (typically close to one Megahertz). The electronic device 102 may continuously monitor the state of the signal provided by the zero-cross detector 106. At the moment the zero-cross signal changes from a logic high to a logic low (or alternatively from a logic low to a logic high), the electronic device 102 may record the value of the counter into internal memory. The electronic device 102 may continue to monitor the state of the zero-cross signal until the zero-cross signal once again changes from a logic high to a logic low (or alternatively from a logic low to a logic high) and the electronic device 102 may again record the counter value into internal memory. The numerical difference of the counter values may be obtained by performing a subtraction of the first value from the second value. The AC line frequency may be calculated by dividing the counter frequency by the numerical difference of the counter values. For example, if the timer frequency is 1,500,000 Hertz, and the numerical difference between two zero cross readings is 25,000 counts, the AC line frequency would be 1,500,000 divided by 25,000, which equals 60 Hertz.

The electronic device 102 may determine 204 the frequency of the power source 136 within a range of 45 Hz to 65 Hz. For example, the electronic device 102 may determine 204 that the AC power frequency of the power source 136 is 60 Hertz (as may be used in the United States, for example). In another example, the electronic device 102 may determine 204 that the AC power frequency of the power source 136 is 50 Hertz (as may be used in Europe and parts of the Pacific Rim, for example).

The electronic device 102 may capture 206 a voltage waveform. For example, the electronic device 102 may capture 206 the voltage waveform as a series of voltage data samples. In some configurations, the electronic device 102 may include a voltage sensor 104 that may capture 206 the voltage waveform. The voltage waveform may include the measured voltage of the line feed from the power source 136 at discrete time increments.

The electronic device 102 may capture 208 a current waveform. For example, the electronic device 102 may capture 208 the current waveform while driving the load 138 for a cycle. In one configuration, the electronic device 102 may drive the load 138 for a full AC cycle. In another configuration, the electronic device 102 may drive the load 138 for a duty cycle. The electronic device 102 may drive the load 138 in a forward phase mode for a cycle. In some configurations, the electronic device 102 may drive the load 138 at different levels based on the wiring mode. If the electronic device 102 is in a non-switch-leg mode, the electronic device 102 may drive the load 138 at 100 percent. If the electronic device 102 is in a switch-leg mode, electronic device 102 may drive the load 138 at approximately 55 percent.

The electronic device 102 may capture 208 the current waveform as a series of current data samples. In some configurations, the electronic device 102 may include a current sensor 132 that may capture 208 the current waveform. The current waveform may include the measured current to the load 138 at discrete time increments. It should be noted that capturing 206 the voltage waveform and capturing 208 the current waveform are shown sequentially in FIG. 2. However, the electronic device 102 may capture 206, 208 the voltage waveform and current waveform concurrently.

The electronic device 102 may determine 210 a load type based on the voltage waveform and the current waveform. For example, the voltage waveform and the current waveform may be used to identify the type of the load 138 being driven (e.g., the type of impedance or the proportion of each type of impedance contained in the load). In some configurations, a phase shift may indicate the type of load 138. For example, inductive load types may be characterized by the voltage waveform leading the current waveform. Capacitive load types may be characterized by the current waveform leading the voltage waveform. Resistive load types may be characterized by the voltage waveform and the current waveform being in sync. The phase shift may differ depending on the wiring mode (e.g., switch-leg mode or non-switch-leg mode). Therefore, the electronic device 102 may also consider the wiring mode when determining the load type.

The shape of the current waveform and/or the voltage waveform may also be used to determine 210 the load type. For example, the harmonic components of the waveform may be analyzed to determine 210 the load type. The behavior of real loads 138 have indicated that more than a phase angle (e.g., phase shift) may be used to determine the type of load 138 being driven (e.g., capacitive, inductive, resistive). The systems and methods used to capture the voltage waveform and the current waveform may maintain waveform fidelity out to approximately the 10th harmonic, so that unusual loads, such as compact fluorescent and LED lighting, can be accurately measured. Moreover, the shape of the waveform and waveform fidelity (e.g., out to the 10th harmonic) may be used to identify the type of load and other load characteristics. In some configurations, a combination of multiple load detection techniques (e.g., based on the phase shift, based on the shape of the current waveform and/or the voltage waveform, etc.) may be used to determine the type of the load that is being driven.

The electronic device 102 (e.g., computing module 116) may determine 212 a power factor based on the voltage waveform, the current waveform and the wiring mode. The power factor of the circuit (e.g., the electronic device 102 and the load 138) may be the ratio of the real power flowing to the load 138 and the apparent power in the circuit. In some configurations, the electronic device 102 may determine the power factor as follows. The electronic device 102 may square each sample of the voltage waveform in a time interval (e.g., one AC cycle), add the squared values to obtain a sum of the squared values, divide the sum by the number of samples to obtain a quotient and take the square root of the quotient to obtain an RMS voltage. It should be noted that other approaches to obtaining RMS voltage may be utilized (e.g., dividing a peak voltage value by $\sqrt{2}$). The electronic device 102 may similarly obtain RMS current by squaring each sample of the current waveform in a time interval, adding the squared values to obtain a sum of the squared values, dividing the sum by the number of samples to obtain a quotient and take the square root of the quotient to obtain the RMS current. It should be noted that other approaches to obtaining RMS current may be utilized (e.g., dividing a peak current value by $\sqrt{2}$). The electronic device 102 may multiply the RMS voltage and RMS current to obtain an apparent power value. The electronic device 102 may obtain a real power value by multiplying aligned voltage and current waveforms. The electronic device 102 may accordingly determine the power factor dividing the real power value by the apparent power value.

In another configuration, when the electronic device 102 is wired in series (e.g., switch-leg mode), the voltage waveform (as measured by the voltage sensor 104) may be distorted. When this is the case, the electronic device 102 may employ an alternate approach to calculate a more accurate power factor. The electronic device 102 may utilize a software algorithm to inspect the numerical values provided by the A/D converter when sampling both the voltage and current waveforms. The algorithm may inspect the numerical values of the voltage and current waveforms to determine the point in time that the sign of the value changes from positive to negative and from negative to positive. This corresponds to when the current and voltage waveforms cross zero. For voltage, this produces the voltage zero-cross. For current, this produces the current zero cross. The algorithm calculates the difference in time between these two points. This difference is equal to the phase shift between voltage and current. The ratio of this time difference to the length of time of one full AC wave cycle, multiplied by 360 degrees gives the phase angle. The cosine of the phase angle is equal to the power factor.

The electronic device 102 may operate 214 the load 138 based on the load type, the power factor and the frequency. For instance, the electronic device 102 may change the way the controller module 112 drives the load 138 based on the impedance of the load 138 and the power at which the load 138 is operating. The electronic device 102 may operate 214 the load 138 differently for inductive and non-inductive load types.

If the load type is inductive, then the electronic device 102 may operate 214 the load 138 based on the current waveform (instead of the voltage waveform). For example, the electronic device 102 may determine an estimated current zero-cross. The estimated current zero-cross may be a point to switch off (e.g., switch point) the load 138 to reduce or avoid the EMF from an inductive load 138. Because the current waveform lags the voltage waveform in an inductive load type, the electronic device 102 may determine an estimated current zero-cross (e.g., the point where the current is zero) based on the known voltage zero-cross, the frequency and the power factor. The voltage zero-cross may be obtained by the zero-cross detector 106, for instance. The estimated current zero-cross may be represented by the phase shift between the voltage waveform and the current waveform.

The frequency is one component that may determine the phase angle that an inductor (e.g., an inductive load 138) will react to. Therefore, the electronic device 102 may skew (e.g., offset) the switch point from the voltage zero-cross for different frequencies to correspond with the estimated current zero-cross. In other words, the estimated current zero-cross represents a delay from the voltage zero-cross when the load 138 may be disengaged (e.g., switched off). The electronic device 102 may empirically determine the switch-on and switch-off times as a function of the power factor and a desired duty cycle (e.g., the length of on-time per AC cycle).

In one configuration, the electronic device 102 may determine the estimated current zero-cross based on a mathematical equation. For example, upon determining the power factor, a bilinear interpolation may be combined with mathematical algorithms to determine the approximate point (e.g., the switch point) when the current to the load 138 may be turned off. The mathematical equation may use the determined power factor and a desired duty cycle as the inputs. The mathematical equation may be a polynomial equation. A polynomial equation may provide benefits in taking up a small amount of code space in the electronic device 102.

In another configuration, the electronic device 102 may determine the estimated current zero-cross based on a lookup table. A lookup table may provide benefits in characterizing non-linearities. Furthermore, a lookup table may compensate for unseen parasitics in the circuits. In one implementation, the lookup table may determine a skew for the switch-on and switch-off times as a function of power factor and a desired duty cycle.

In yet another configuration, the electronic device 102 may determine the estimated current zero-cross by first using a lookup table and then applying the results to a mathematical equation. Sample code employing a combination of a lookup table and mathematical equation is provided in Listing (1) and Listing (2). The lookup table is illustrated in Listing (1). A bilinear interpolation is then performed in Listing (2) using the results of the lookup table.

Listing (1)

```
const int nPfValues = 9;
double[ ] pfValues = new double[nPfValues]
{
    0.180, 0.301, 0.378, 0.476, 0.567, 0.677, 0.796, 0.917, 0.990
};
const int nDrValues = 4;
double[ ] drValues = new double[nDrValues]
{
    0.1, 0.25, 0.5, 0.75
};
double[ ] iT = new double[nPfValues * nDrValues]
{
    1052, // pf,duty: 0.18,0.1
    1068, // pf,duty: 0.18,0.25
    1161, // pf,duty: 0.18,0.5
    1259, // pf,duty: 0.18,0.75
    1044, // pf,duty: 0.301,0.1
    1084, // pf,duty: 0.301,0.25
    1188, // pf,duty: 0.301,0.5
    1229, // pf,duty: 0.301,0.75
    1065, // pf,duty: 0.378,0.1
    1071, // pf,duty: 0.378,0.25
    1155, // pf,duty: 0.378,0.5
    1211, // pf,duty: 0.378,0.75
    1053, // pf,duty: 0.476,0.1
    1067, // pf,duty: 0.476,0.25
    1133, // pf,duty: 0.476,0.5
    1162, // pf,duty: 0.476,0.75
    1056, // pf,duty: 0.567,0.1
    1056, // pf,duty: 0.567,0.25
    1109, // pf,duty: 0.567,0.5
    1132, // pf,duty: 0.567,0.75
    1069, // pf,duty: 0.677,0.1
    1058, // pf,duty: 0.677,0.25
    1091, // pf,duty: 0.677,0.5
    1096, // pf,duty: 0.677,0.75
    1042, // pf,duty: 0.796,0.1
    1037, // pf,duty: 0.796,0.25
    1055, // pf,duty: 0.796,0.5
    1031, // pf,duty: 0.796,0.75
    1018, // pf,duty: 0.917,0.1
    978,  // pf,duty: 0.917,0.25
    975,  // pf,duty: 0.917,0.5
    957,  // pf,duty: 0.917,0.75
    928,  // pf,duty: 0.99,0.1
    944,  // pf,duty: 0.99,0.25
    939,  // pf,duty: 0.99,0.5
    935,  // pf,duty: 0.99,0.75
};
```

In Listing (1), the lookup table nPfValues indicates the number of power factor values, pfValues represents the value of the power factors, nDrValues indicates the number of duty cycles and drValues represents the value of the duty cycles. iT provides various skew values associated with different combinations of power factor and duty cycle. The results of the lookup table in Listing (1) may be incorporated in a bilinear interpolation for an arbitrary power factor (e.g., arbPF) and desired duty cycle (e.g., arbDutyCycle) as illustrated in Listing (2).

Listing (2)

```
Skew = BiLinFit(arbPF, arbDutyCycle);
    private double BiLinFit(double pf, double dimRatio)
    {
        int i;
        int j;
        double f = 0;
        double x;
        double y;
        double x1;
        double x2;
        double y1;
        double y2;
        double fq11;
```

-continued

Listing (2)

```
        double fq12;
        double fq21;
        double fq22;
        int ix1;
        int ix2;
        int iy1;
        int iy2;
        // Make sure the parameters are valid
        if (pf < 0)
            pf = 0;
        if (pf > 1.0)
            pf = 1.0;
        if (dimRatio < 0)
            dimRatio = 0;
        if (dimRatio > 1.0)
            dimRatio = 1.0;
        for (i = 0; i < nPfValues; i++)
        {
            if (pf <= pfValues[i])
                break;
        }
        if (i == 0)
        {
            ix1 = 0;
            ix2 = 1;
        }
        else if (i == nPfValues)
        {
            ix1 = nPfValues - 2;
            ix2 = nPfValues - 1;
        }
        else
        {
            ix1 = i - 1;
            ix2 = i;
        }
        for (j = 0; j < nDrValues; j++)
        {
            if (dimRatio <= drValues[j])
                break;
        }
        if (j == 0)
        {
            iy1 = 0;
            iy2 = 1;
        }
        else if (j == nDrValues)
        {
            iy1 = nDrValues - 2;
            iy2 = nDrValues - 1;
        }
        else
        {
            iy1 = j - 1;
            iy2 = j;
        }
        x1 = pfValues[ix1];
        x2 = pfValues[ix2];
        y1 = drValues[iy1];
        y2 = drValues[iy2];
        x = pf;
        y = dimRatio;
        fq11 = iT[ix1 * nDrValues + iy1];
        fq12 = iT[ix1 * nDrValues + iy2];
        fq21 = iT[ix2 * nDrValues + iy1];
        fq22 = iT[ix2 * nDrValues + iy2];
        f = ( fq11 * (x2-x) * (y2-y) +
              fq21 * (x-x1) * (y2-y) +
              fq12 * (x2-x) * (y-y1) +
              fq22 * (x-x1) * (y-y1)) / ( (x2-x1) * (y2-y1));
        return f;
}
```

Upon determining the estimated current zero-cross, the electronic device 102 may switch off the load based on the estimated current zero-cross. For example, the electronic device 102 may perform forward phase pulse width modulation based on the estimated current zero-cross. The electronic device 102 may switch off the load at or near the estimated current zero-cross.

If the load type is non-inductive (e.g., the load type is resistive or capacitive), then the electronic device 102 may operate 214 the load 138 based on the voltage waveform. It should be noted that non-inductive load types do not suffer from the EMF risks associated with inductive load types. Therefore, non-inductive load types may be switched off based on the voltage waveform. For example, the electronic device 102 may determine when to switch off the load 138 based on the voltage waveform. If the load type is capacitive, the electronic device 102 may use reverse phase pulse width modulation based on the voltage waveform. If the load type is resistive (e.g., the power factor is 1), the electronic device 102 may use either forward or reverse phase pulse width modulation based on the voltage waveform. One benefit of using the voltage waveform to operate 214 a non-inductive load is that the voltage waveform may provide more predictability.

In one scenario, the method 200 may be initiated when the electronic device 102 may encounter a new load 138. For example, the method 200 may be performed when the electronic device 102 is shipped from the factory (e.g., a fresh installation) or put into a factory reset. In another scenario, the method 200 may be initiated when the electronic device 102 may receive a command (from a communication modem, for instance) to perform the method 200.

Some of the functions or procedures in the method 200 may be performed while the electronic device 102 is in a training mode. For example, steps 202-212 may be performed while in a training mode. Additionally or alternatively, one or more of the functions or procedures in the method 200 may be performed while the electronic device is in an operating mode. For example, step 214 may be performed while in an operating mode. In other words, upon performing the steps of the training mode, the electronic device 102 may enter an operating mode to operate (e.g., drive) the load 138.

It should be noted that the power factor may vary with duty cycle. Therefore, the electronic device 102 may maintain an approximate value of the power factor through various duty cycle ranges. The electronic device 102 may continually monitor the load 138 for out of range conditions. This may allow the electronic device 102 to detect changes that may occur with the load 138, such as a failure of a load ballast, the removal of a load type, or the addition of a different load type. The electronic device 102 may then respond to these changes by repeating the method 200. In other words, the electronic device 102 may be re-trained for these new conditions.

Figure 3:
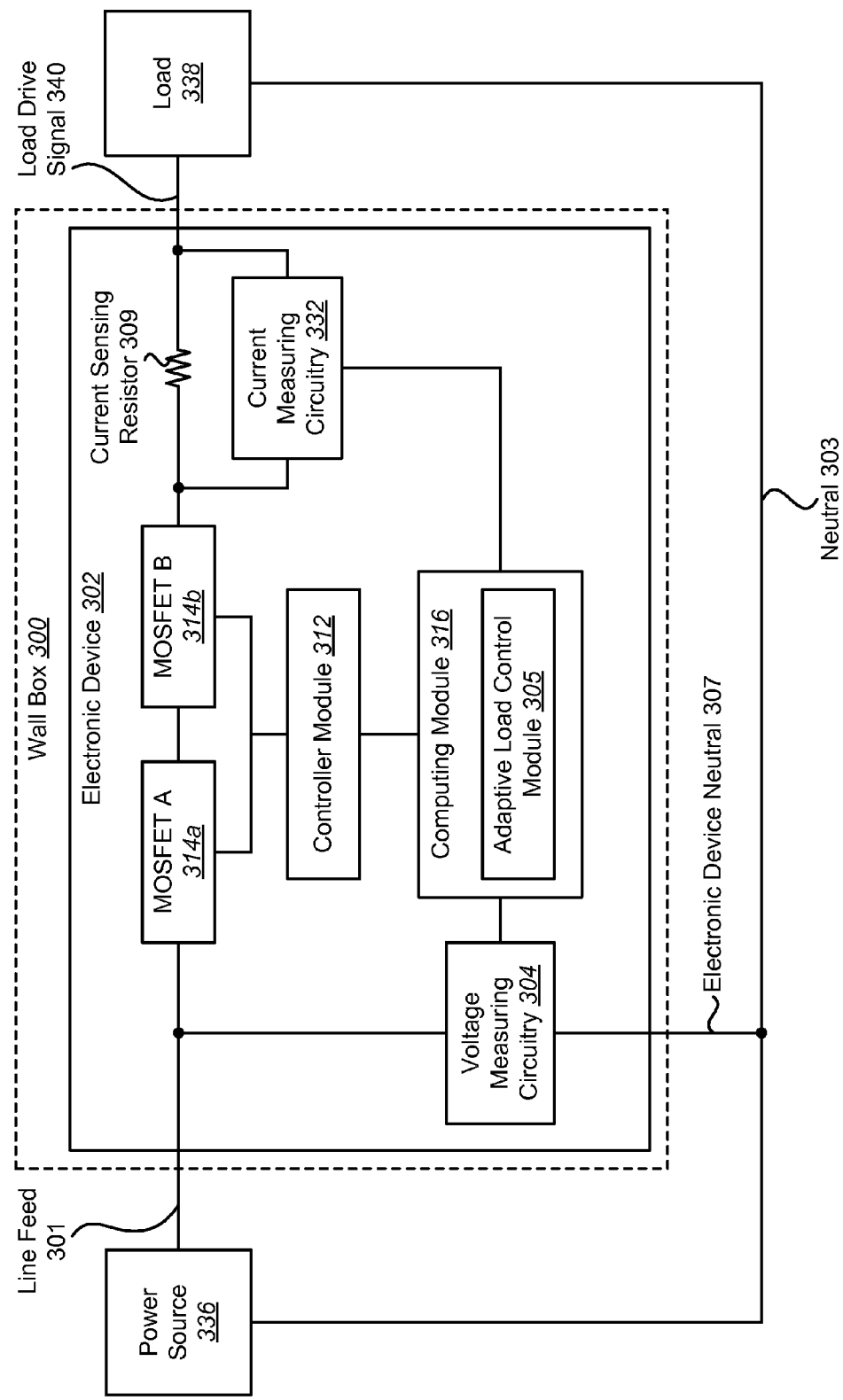
FIG. 3 is a block diagram illustrating one example of an electronic device wired in non-switch-leg mode (e.g., parallel mode)
Figure 4:
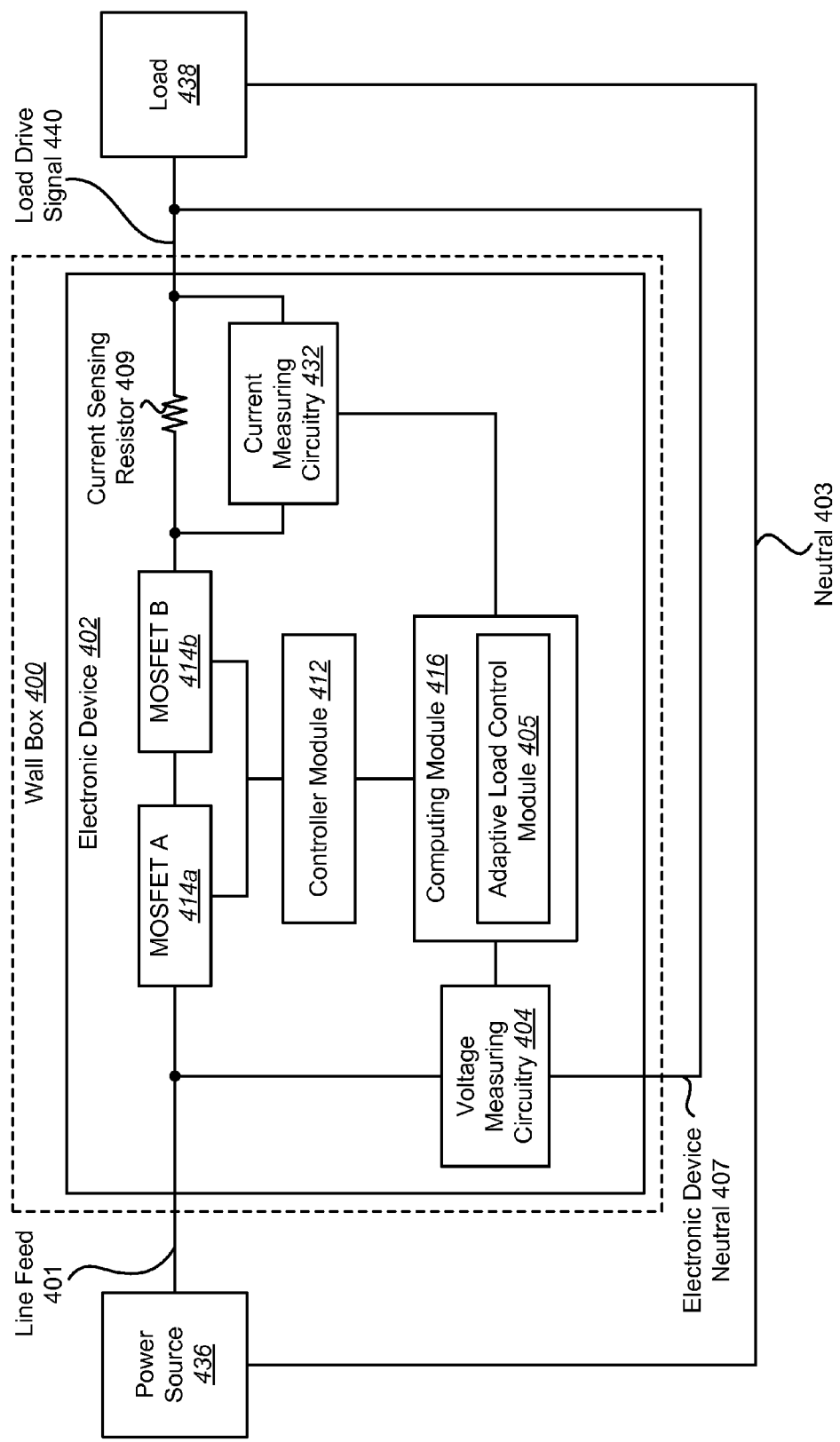
FIG. 4 is a block diagram illustrating one example of an electronic device wired in switch-leg mode (e.g., series mode)

FIG. 3 is a block diagram illustrating one example of an electronic device 302 wired in non-switch-leg mode (e.g., parallel mode). The electronic device 302 described in connection with FIG. 3 may be one example of the electronic device 102 described in connection with FIG. 1. In this example, a power source 336 (e.g., an electrical panel that provides mains electricity) is coupled to the electronic device 302 through a line feed 301. The line feed 301 is coupled to MOSFET A 314a, which is coupled to MOSFET B 314b. The line feed 301 may provide AC power to the electronic device 302. The electronic device 302 may utilize the line feed to power the electronic device 302 components as well as to drive the load 338. The electronic device 302 is coupled to a load 338 and provides a load drive signal 340 to the load 338. In this example, MOSFET B 314b is coupled to a current sensing resistor 309, which is coupled to the load 338. In another configuration, the current sensing resistor 309 may be coupled between the power source 336 and MOSFET A 314a.

The load 338 is also coupled to the power source 336 through a neutral 303 or return line (e.g., mains neutral).

In non-switch-leg mode (e.g., parallel mode), voltage measuring circuitry 304 is coupled to the power source 336 through the neutral 303 or return line (e.g., mains neutral). For example, an electronic device neutral 307 is coupled to the power source 336 and the load 338 through a neutral 303. In other words, a neutral terminal of the electronic device 302 is coupled to the neutral 303 or return line. Non-switch-leg mode is one configuration of a wiring mode for the circuit that includes the power source 336, the electronic device 302 and the load 338.

As illustrated in this example, the electronic device 302 may have dimensions for fitting within a wall box 300. In some configurations, the electronic device 302 may include mounting (e.g., brackets, tabs, screw ports, etc.) for integration with the wall box 300. The electronic device 302 may also include current measuring circuitry 332 that is coupled to each node of the current sensing resistor 309 and a computing module 316. In one configuration, the computing module 316 may include a central processing unit (CPU). The computing module 316 may also include an adaptive load control module 305. The adaptive load control module 305 described in connection with FIG. 3 may be one example of the adaptive load control module 105 described in connection with FIG. 1. The computing module 316 is also coupled to the voltage measuring circuitry 304 and a controller module 312.

FIG. 4 is a block diagram illustrating one example of an electronic device 402 wired in switch-leg mode (e.g., series mode). The electronic device 402 described in connection with FIG. 4 may be one example of the electronic device 102 described in connection with FIG. 1. In this example, a power source 436 (e.g., an electrical panel that provides mains electricity) is coupled to the electronic device 402 through a line feed 401. The line feed 401 is coupled to MOSFET A 414a, which is coupled to MOSFET B 414b. The line feed 401 may provide AC power to the electronic device 402. The electronic device 402 may utilize the line feed 401 to power the electronic device 402 components as well as to drive the load 438. The electronic device 402 is coupled to a load 438 and provides a load drive signal 440 to the load 438. In this example, MOSFET B 414b is coupled to a current sensing resistor 409, which is coupled to the load 438. In another configuration, the current sensing resistor 409 may be coupled between the power source 436 and MOSFET A 414a. The load 438 is also coupled to the power source 436 through a neutral 403 or return line (e.g., mains neutral).

In switch-leg mode (e.g., series mode), an electronic device neutral 407 is also coupled to the load 438 through the load drive output that provides the load drive signal 440. In other words, a neutral terminal of the electronic device 402 is not coupled to the neutral 403 or return line. In one implementation, voltage measuring circuitry 404 is coupled to the power source 436 through the line feed 401. The voltage measuring circuitry 404 is also coupled to the load 438 through the load drive output that provides the load drive signal 440. Switch-leg mode is one configuration of a wiring mode for the circuit that includes the power source 436, electronic device 402 and the load 438.

As illustrated in this example, the electronic device 402 may have dimensions for fitting within a wall box 400. In some configurations, the electronic device 402 may include mounting (e.g., brackets, tabs, screw ports, etc.) for integration with the wall box 400. The electronic device 402 may also include current measuring circuitry 432 that is coupled to each node of the current sensing resistor 409 and a computing module 416. In one configuration, the computing module 416 may include a central processing unit (CPU). The computing module 416 may also include an adaptive load control module 405. The adaptive load control module 405 described in connection with FIG. 4 may be one example of the adaptive load control module 105 described in connection with FIG. 1. The computing module 416 is also coupled to the voltage measuring circuitry 404 and a controller module 412.

It should be noted that the current and voltage waveforms may differ significantly depending on whether the electronic device 102 is wired in a switch-leg mode (as illustrated in FIG. 4) or a non-switch-leg mode (as illustrated in FIG. 3). In a switch-leg mode (also referred to as series mode), the electronic device 402 may be wired into a circuit without a neutral 403. For example, the line feed 401 (e.g., hot lead) from a power source 436 (e.g., electrical panel) may be coupled to one lead of the electronic device 402. The electronic device neutral 407 lead and load lead (that provides the load drive signal 440) of the electronic device 402 may be coupled to the load 438. In this case, the electronic device 402 may be powered using the return to the load 438.

In some configurations, it may be common to have wiring situations where a neutral wire is not available at the location where the electronic device 402 will be installed (e.g., the wall box 400). In these situations, the electronic device 402 may not be powered in parallel with the hot and neutral alternating current (AC) wires but in series with the hot and load wires. These may be the situations in which the electronic device 402 is wired in switch-leg mode.

Figure 5:
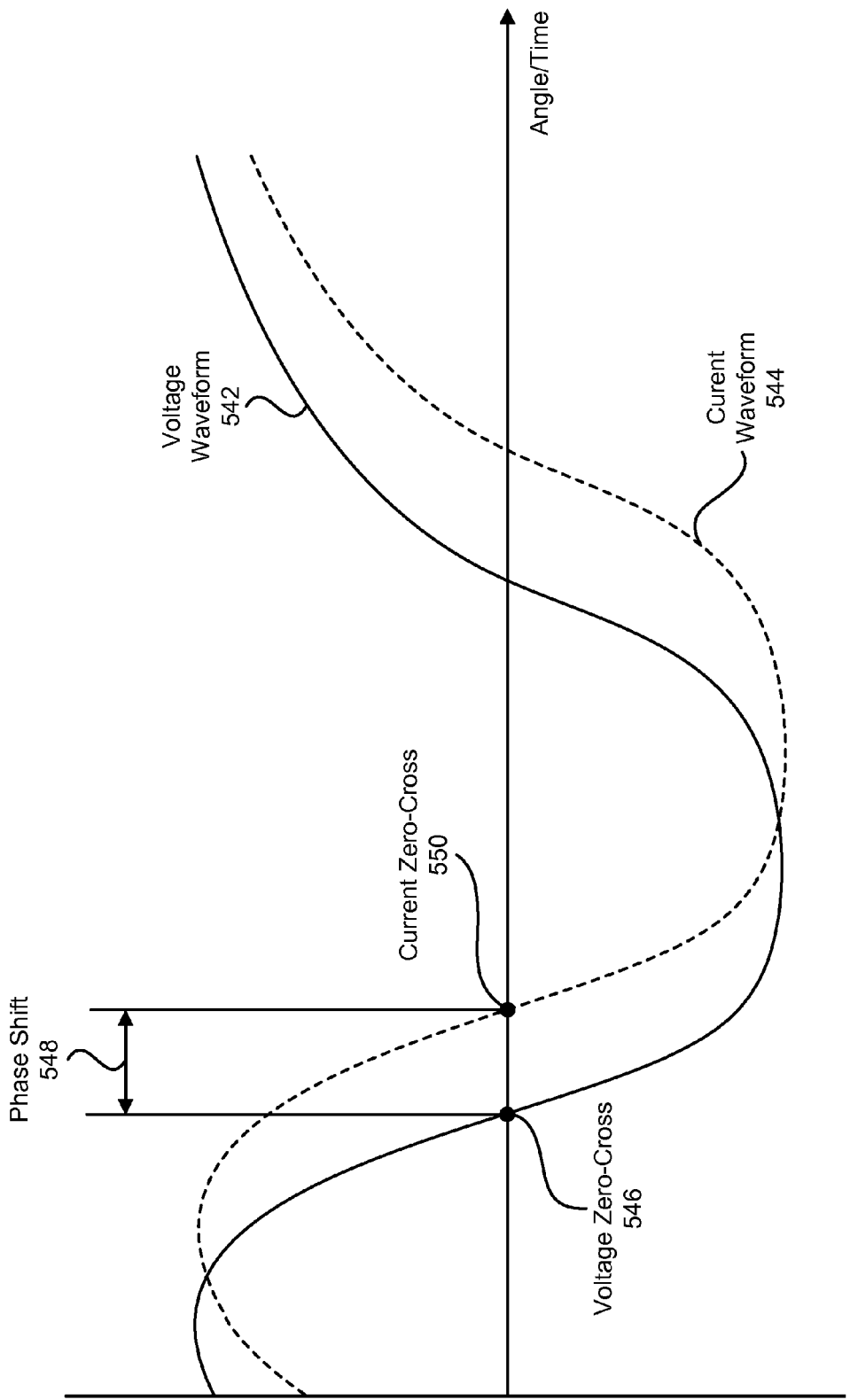
FIG. 5 is a diagram illustrating a phase shift between a voltage waveform and a current waveform.

FIG. 5 is a diagram illustrating a phase shift 548 between a voltage waveform 542 and a current waveform 544. The voltage waveform 542 and current waveform 544 may represent the voltage and current as measured by the electronic device 102 as described above in connection with FIG. 1. For example, a power source 136 may provide high voltage AC. A typical waveform for an AC power circuit is a sine wave. As illustrated in FIG. 5, the voltage waveform 542 and the current waveform 544 are sine waves having the frequency of the power source 136. However, the voltage waveform 542 and the current waveform 544 may take different shapes during operation of the electronic device 102.

In a purely resistive circuit, the voltage waveform 542 and the current waveform 544 will be in phase with each other. Therefore, a resistive circuit will not have a phase shift 548 between the voltage waveform 542 and the current waveform 544.

In an inductive or capacitive circuit, however, the voltage waveform 542 and the current waveform 544 will be out of phase. In the case of an inductive load type, the voltage waveform 542 leads the current waveform 544 (as illustrated in FIG. 5). Therefore, an inductive load type will have a phase shift 548 between the voltage waveform 542 and the current waveform 544. Therefore, in an inductive circuit, the voltage zero-cross 546 occurs before the current zero-cross 550.

The phase shift 548 may be expressed as an angle (e.g., phase angle). The phase shift 548 may also be expressed in units of time. Therefore, the phase shift 548 may represent a delay between the voltage zero-cross 546 and the current zero-cross 550. The electronic device 102 may determine an estimated current zero-cross 550 based on the voltage zero-cross 546 and the phase shift 548 as described above in connection with FIG. 2.

Figure 6:
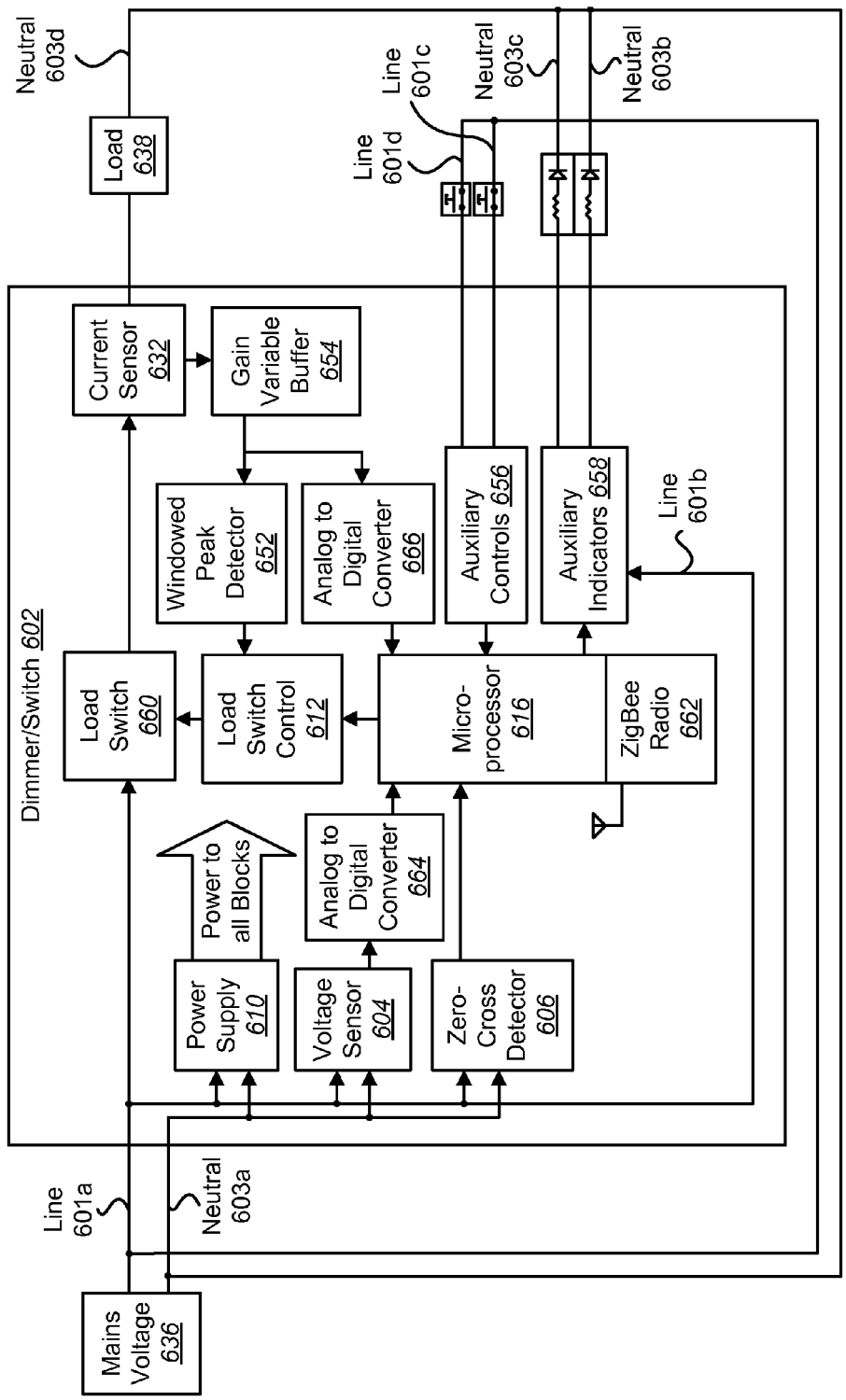
FIG. 6 is a block diagram illustrating one configuration of a dimmer/switch in which systems and methods for adaptive load control may be implemented.

FIG. 6 is a block diagram illustrating one configuration of a dimmer/switch 602 in which systems and methods for adaptive load control may be implemented. The dimmer/switch 602 of FIG. 6 may be one configuration of the electronic device 102 described above in connection with FIG. 1. In some configurations, one or more of the elements described in connection with FIG. 6 may be configured with similar functionality to corresponding elements described in connection with FIG. 1.

The dimmer/switch 602 may receive a voltage waveform from a mains voltage 636. The dimmer/switch 602 may also include an internal power supply 610 coupled to the mains voltage 636 that provides power to each module/block within the dimmer/switch 602. The mains voltage 636 may provide power to the dimmer/switch 602 via a line 601a-d coupled to a load switch 660, a power supply 610, a voltage sensor 604, a zero-cross detector 606, auxiliary indicators 658 and auxiliary controls 656. The mains voltage 636 may also be coupled to the power supply 610, the voltage sensor 604, the zero-cross detector 606, the auxiliary indicators 658 and a load 638 via a neutral line 603a-d. The neutral line 603a-d may be a return line for different modules/blocks within the dimmer/switch 602 providing a return to a ground reference voltage.

The dimmer/switch 602 may include a microprocessor 616. The microprocessor 616 may include some or all of the components of the computing module 116 described above in connection with FIG. 1. The microprocessor 616 may include or be coupled to a ZigBee radio 662. The ZigBee radio 662 may be used for communicating with other electronic devices. The voltage sensor 604 may be coupled to the microprocessor 616 via an A/D converter 664. The current sensor 632 may be coupled to the microprocessor 616 via a second A/D converter 666. The current sensor 632 may also be coupled to a gain variable buffer 654. The gain variable buffer 654 may be coupled to a windowed peak detector 652 and the second A/D converter 666. In some configurations, the A/D converters 664, 666 are part of the microprocessor 616. The microprocessor 616 may also be coupled to the zero-cross detector 606, the auxiliary controls 656 and the auxiliary indicators 658. The microprocessor 616 may also be coupled to the load switch 660 for engaging or disengaging the load 638 via instruction from a load switch control 612.

Figure 7:
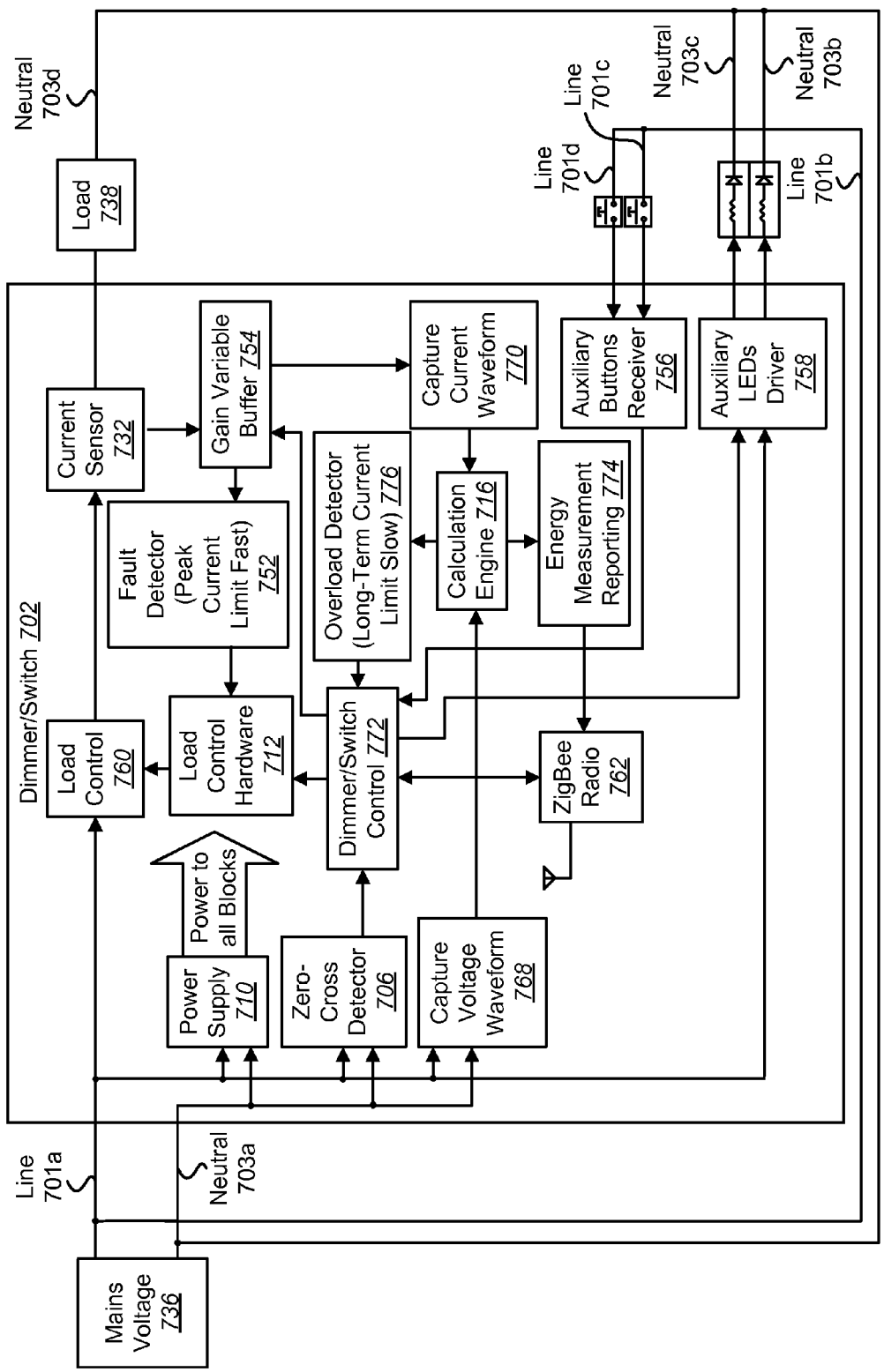
FIG. 7 is a block diagram illustrating another configuration of a dimmer/switch in which systems and methods for adaptive load control may be implemented.

FIG. 7 is a block diagram illustrating another configuration of a dimmer/switch 702 in which systems and methods for adaptive load control may be implemented. The dimmer/switch 702 may be one configuration of the electronic device 102 and/or the dimmer/switch 602 described above in connection with FIG. 1 and FIG. 6. In some configurations, one or more of the elements described in connection with FIG. 7 may be configured with similar functionality to corresponding elements described in connection with FIG. 1 and/or FIG. 6.

The dimmer/switch 702 may receive a voltage waveform from a mains voltage 736. The dimmer/switch 702 may also include an internal power supply 710 coupled to the mains voltage 736 that provides power to each module/block within the dimmer/switch 702. The mains voltage 736 may provide power to the dimmer/switch 702 via a line 701a-d coupled to a load control 760, a power supply 710, a zero-cross detector 706, a capture voltage waveform block 768, auxiliary buttons receiver 756 and an auxiliary LEDs driver 758. The mains voltage 736 may also be coupled to the power supply 710, the zero-cross detector 706, the capture voltage waveform block 768, the auxiliary LEDs driver 758 and the load 738 via a neutral line 703a-d. The neutral line 703a-d may be a return line for different modules/blocks within the dimmer/switch 702 providing a return to a ground reference voltage. The dimmer/switch 702 may also include a load control 760 coupled to load control hardware 712 and a current sensor 732. The load control hardware 712 may be coupled to a fault detector 752 (e.g., peak current limit fast) and a microprocessor (not shown). The fault detector 752 may be coupled to a gain variable buffer 754. The gain variable buffer 754 may be coupled to the current sensor 732 and the microprocessor. Moreover, each of the power supply 710, zero-cross detector 706, capture voltage waveform block 768, auxiliary LEDs driver 758 and auxiliary buttons receiver 756 may be coupled to a microprocessor housed within the dimmer/switch 702.

Many of the components shown on the dimmer/switch 702 of FIG. 7 may be implemented within a microprocessor. For example, the microprocessor may include a dimmer/switch control 772, an overload detector 776 (e.g., long-term current limit slow), a calculation engine 716, a capture current waveform block 770, an energy measurement reporting block 774 and a ZigBee radio 762. Some or all of these components may be housed within the microprocessor and coupled to other modules/blocks within the dimmer/switch 702. For example, the dimmer/switch control 772 may be coupled to the zero-cross detector 706, the load control hardware 712, the gain variable buffer 754, the ZigBee radio 762, the auxiliary LEDs driver 758 and the auxiliary buttons receiver 756. The overload detector 776 may be coupled to the calculation engine 716. The calculation engine 716 may be coupled to the capture voltage waveform block 768, the capture current waveform block 770 and the energy measurement reporting block 774. The energy measurement reporting block 774 may be coupled to the ZigBee radio 762.

Figure 8:
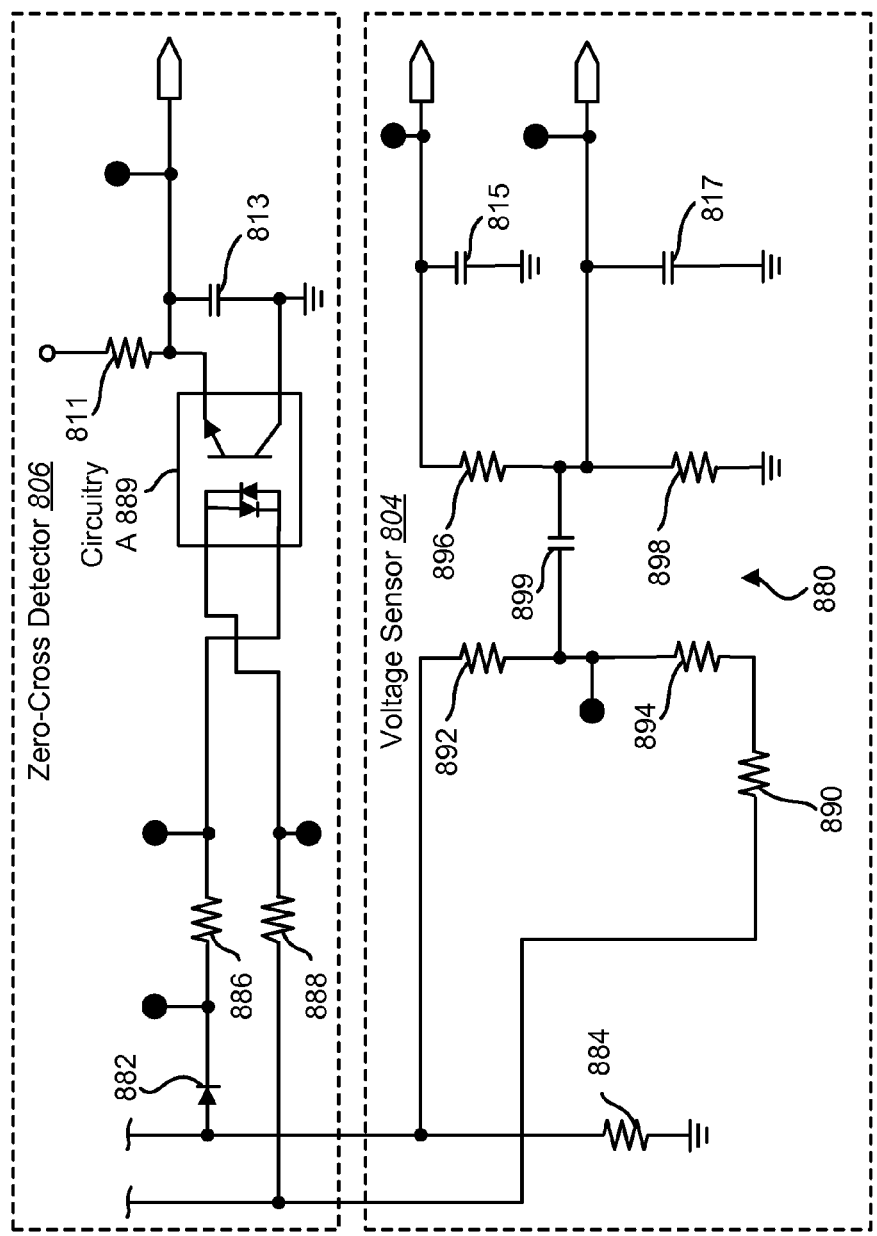
FIG. 8 is a circuit diagram illustrating one configuration of a voltage sensor and a zero-cross detector in accordance with the systems and methods described herein.

FIG. 8 is a circuit diagram illustrating one configuration of a voltage sensor 804 and a zero-cross detector 806 in accordance with the systems and methods described herein. In one configuration, the electronic device 102 may include circuitry A 889 and other circuitry to implement a zero-cross detector 806. The zero-cross detector 806 may be one configuration of the zero-cross detector 106 described above in connection with FIG. 1. A first pin of circuitry A 889 may be coupled to other components within the electronic device 102 and a resistor 888. The resistor 888 may be coupled to a return line and a resistor 890. A second pin of circuitry A 889 may be coupled to other components within the electronic device 102 and a resistor 886. The resistor 886 may be coupled to other components within the electronic device 102 and to an output of a diode 882. The input of the diode 882 may be coupled to a line voltage. A third pin of circuitry A 889 may be coupled to a capacitor 813 and ground. A fourth pin of circuitry A 889 may be coupled to a resistor 811, the capacitor 813 and other component within the electronic device 102. The resistor 811 may be coupled to a supply voltage. The capacitor 813 may be coupled to ground and the third port of circuitry A 889.

In some configurations, the voltage sensor 104 may include circuitry to implement a voltage sensor 804. For instance, the voltage sensor 804 illustrated in FIG. 8 may be one example of and/or may provide similar elements and functionality of the voltage sensor 104 described above in connection to FIG. 1. The voltage sensor 804 may include a network of resistors 880 for scaling a voltage (e.g., mains voltage, power supply). The network of resistors 880 may include a first resistor 892, second resistor 894, third resistor 896 and fourth resistor 898. The first resistor 892 may be coupled to the second resistor 894 and other components within the electronic device 102. The third resistor 896 may be coupled to the fourth resistor 898. The first resistor 892 may be coupled to a line voltage and a resistor 884 that is coupled to ground. The second resistor 894 may be coupled to a resistor 890 that is coupled to a return line. The third resistor 896 may be coupled to a capacitor 815 and other components within the electronic device 102. The capacitor 815 may be coupled to ground. The fourth resistor 898 may be coupled to a capacitor 817 and other components within the electronic device 102. The capacitor 817 may be coupled to ground. Each of the first resistor 892, second resistor 894, third resistor 896 and fourth resistor 898 may be coupled to each other via a capacitor 899.

Figure 9:
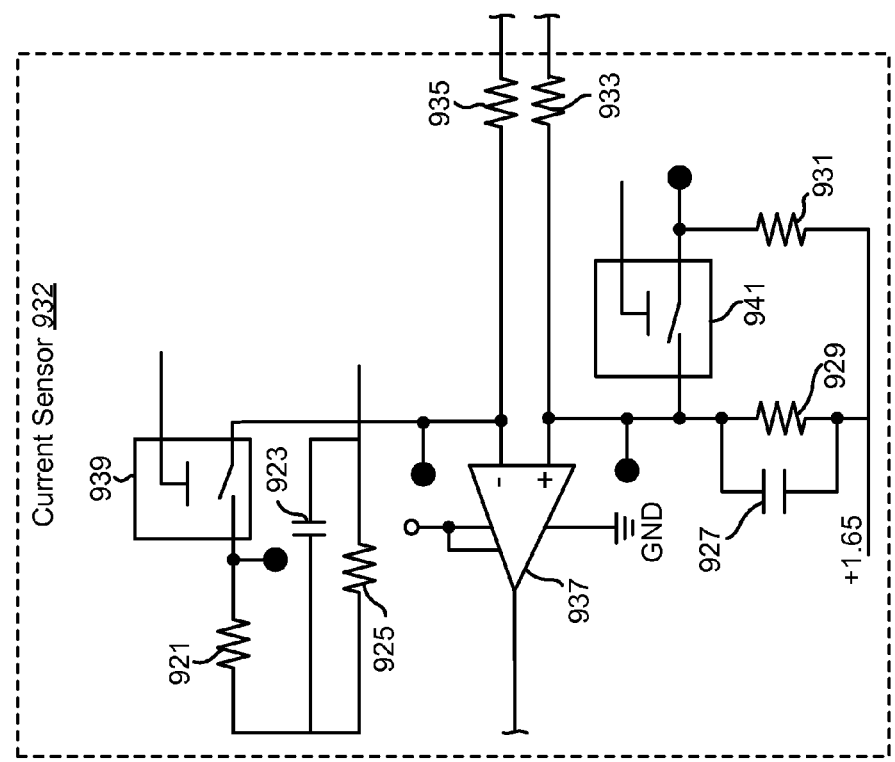
FIG. 9 is a circuit diagram illustrating one configuration of a current sensor in accordance with the systems and methods described herein.

FIG. 9 is a circuit diagram illustrating one configuration of a current sensor 932 in accordance with the systems and methods described herein. The circuit may be one configuration of a current sensor 932 found within the electronic devices 102, 302, 402, 602, 702 described above in connection with FIGS. 1, 3, 4, 6 and 7. It should be noted that one or more of the various circuitries described herein may be implemented in chip packages. The amplifier 937 may be implemented as part a current sensor 932. The current sensor 932 may be implemented within the computing module 116.

The current sensor 932 may also include a first analog switch 939 and a second analog switch 941. The analog switches 939, 941 may be used to control a threshold value of current flowing through the electronic device 102. For example, a specific load 138 may have an inrush current and settling time specifications that indicate different levels of current that may safely flow through the electronic device 102 at a given time of operation. The analog switches 939, 941 may be used to modify a threshold value based on an appropriate amount of current that should be allowed to pass through the electronic device 102. The analog switches 939, 941 may be adjusted multiple times during operation of a load 138 to adjust for current variations. Further, the analog switches 939, 941 may assist the computing module 116 in determining whether a current exceeds a threshold value and determining whether to engage or disengage the load 138 to protect components within the electronic device 102. In some configurations, the electronic device 102 may include additional analog switches for implementing detection of additional threshold current values.

The amplifier 937 may be coupled to a supply voltage and to ground. As described above, the output of the amplifier 937 may be coupled to a resistor (not shown) as well as being coupled to other components within the electronic device 102. The negative input of the amplifier 937 may be coupled to a resistor 935 (and also coupled to the controller module 112). The negative input of the amplifier 937 may also be coupled to other components within the electronic device 102. The negative input of the amplifier 937 may also be coupled to a resistor 925 and a capacitor 923 in parallel. The negative input of the amplifier 937 may also be coupled to a first analog switch 939 connected to a resistor 921 and other components within the electronic device 102. The first analog switch 939 and the resistor 921 may be in parallel to the capacitor 923 and the resistor 925. The positive input of the amplifier 937 may be coupled to a resistor 933 which is coupled to the controller module 112 and other components within the electronic device 102. The positive input of the amplifier 937 may also be coupled to a capacitor 927 and a resistor 929 in parallel. The positive input of the amplifier 937 may also be coupled to a second analog switch 941 which is coupled to a resistor 931. The second analog switch 941 and the resistor 931 may be in parallel to the resistor 929 and the capacitor 927. The capacitor 927, resistor 929 and resistor 931 may be coupled to a reference voltage between the supply voltage and the ground.

Figure 10:
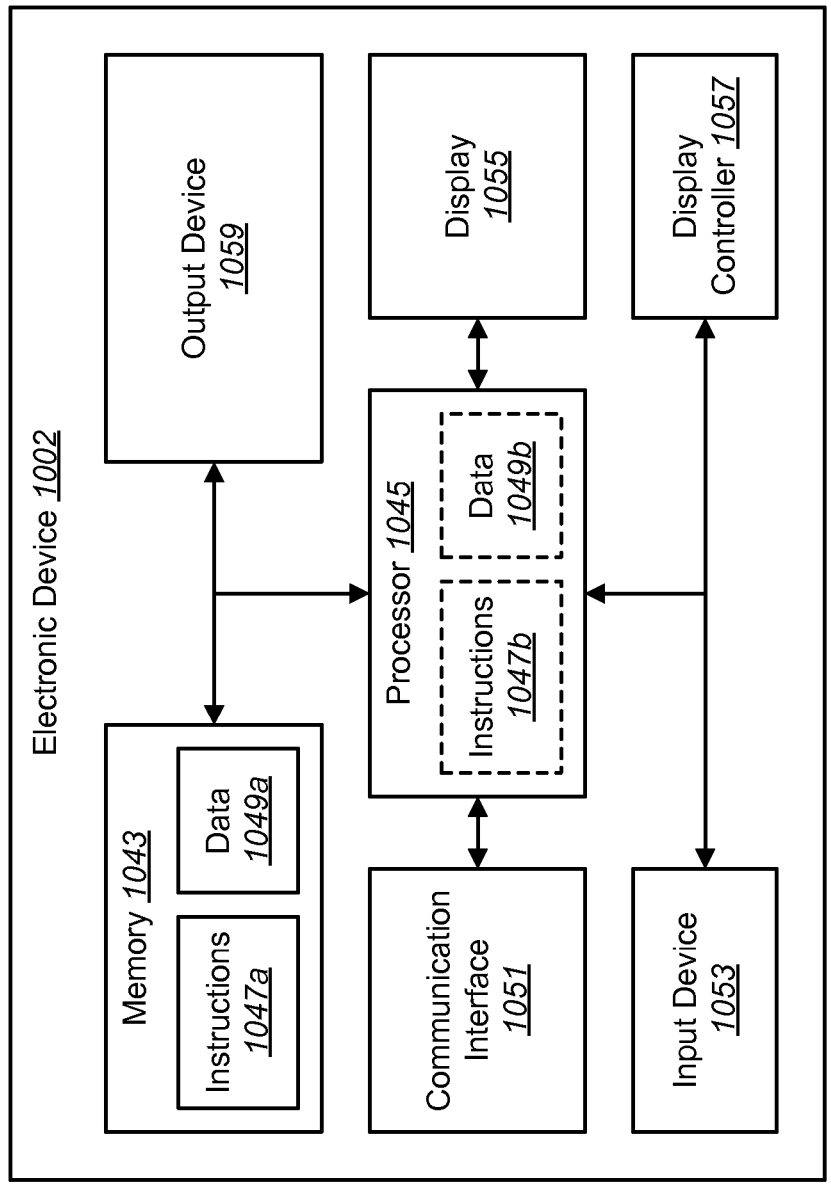
FIG. 10 illustrates various components that may be utilized on an electronic device.

FIG. 10 illustrates various components that may be utilized on an electronic device 1002. One or more of the electronic device 102, 302, 402, 602 and 702 described previously may be configured similar to the electronic device 1002 illustrated in FIG. 10. For example, the electronic device 1002 may be configured to perform the method 200 described above. The electronic device 1002 may include a memory 1043, a communication interface 1051, an input device 1053, a processor 1045, an output device 1059, a display 1055 and a display controller 1057. The memory 1043 may store instructions 1047a and data 1049a. The processor 1045 may operate on instructions 1047b and data 1049b.

The term "discrete circuit" refers to an electronic circuit built out of discrete components. Examples of discrete components include resistors, capacitors, inductors, transformers, transistors, etc. In some configurations, a discrete circuit may not be a solid state integrated circuit that performs all of the functions described herein. However, a discrete circuit may include one or more discrete components contained in the same packaging (e.g., TRIAC, bridge rectifier, solid state relay, etc.). In some configurations, a discrete circuit made from discrete components refers to a circuit having separate components or circuits that perform individual finite functions. For instance, examples of a discrete circuit may include the voltage sensor 104, controller module 112, computing module 116 and current sensor 132 that may perform separate and discrete functions while being implemented within an electronic device 102 within a wall box 100. Moreover, each module within the electronic device 102 may include discrete components or discrete circuits within each module. In some instances, the term "circuit" may refer to a circuit in its entirety, for example, including the impedance of the wall box device and the impedance of the load.

As used herein, the term "coupled" and other variations thereof may mean that one element is connected to another element directly or indirectly. For example, if a first element is coupled to a second element, the first element may be connected directly to the second element or may be connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for adaptive load control by an electronic device, comprising:
   determining a wiring mode;
   determining a frequency of a power source;
   capturing a voltage waveform;
   capturing a current waveform;
   determining a load type of a load based on the voltage waveform and the current waveform;
   determining a power factor based on the voltage waveform, the current waveform and the wiring mode; and
   operating the load based on the load type, the power factor and the frequency.

2. The method of claim 1, wherein if the load type is inductive, then operating the load comprises:
   determining an estimated current zero-cross; and
   switching off the load based on the estimated current zero-cross.

3. The method of claim 2, wherein determining the estimated current zero-cross is based on a mathematical equation.

4. The method of claim 2, wherein determining the estimated current zero-cross is based on a lookup table.

5. The method of claim 2, wherein determining the estimated current zero-cross is based on a lookup table and a mathematical equation.

6. The method of claim 2, wherein the estimated current zero-cross comprises a delay from a voltage zero-cross.

7. The method of claim 1, wherein if the load type is resistive or capacitive, then operating the load comprises switching off the load based on the voltage waveform.

8. The method of claim 1, wherein the wiring mode is one of a switch-leg mode and a non-switch-leg mode.

9. The method of claim 1, wherein the electronic device has dimensions for fitting within a wall box.

10. The method of claim 1, wherein the method is performed in response to a new load or an out of range condition.

11. An electronic device for adaptive load control, comprising:
    a voltage sensor, wherein the voltage sensor captures a voltage waveform;
    a current sensor, wherein the current sensor captures a current waveform;
    a computing module coupled to the voltage sensor and the current sensor, wherein the computing module:
       determines a wiring mode;
       determines a frequency of a power source;
       determines a load type of a load based on the voltage waveform and the current waveform;
       determines a power factor based on the voltage waveform, the current waveform and the wiring mode; and
       operates the load based on the load type, the power factor and the frequency.

12. The electronic device of claim 11, wherein if the load type is inductive, then operating the load comprises:
    determining an estimated current zero-cross; and
    switching off the load based on the estimated current zero-cross.

13. The electronic device of claim 12, wherein determining the estimated current zero-cross is based on a mathematical equation.

14. The electronic device of claim 12, wherein determining the estimated current zero-cross is based on a lookup table.

15. The electronic device of claim 12, wherein determining the estimated current zero-cross is based on a lookup table and a mathematical equation.

16. The electronic device of claim 12, wherein the estimated current zero-cross comprises a delay from a voltage zero-cross.

17. The electronic device of claim 11, wherein if the load type is resistive or capacitive, then operating the load comprises switching off the load based on the voltage waveform.

18. The electronic device of claim 11, wherein the wiring mode is one of a switch-leg mode and a non-switch-leg mode.

19. The electronic device of claim 11, wherein the electronic device has dimensions for fitting within a wall box.

20. The electronic device of claim 11, wherein the computing module determines the load type and operates the load in response to a new load or an out of range condition.

* * * * *